May 12, 1936.                    H. E. KOPSCH                    2,040,517
                                CHUCK MECHANISM
                              Filed Oct. 22, 1934
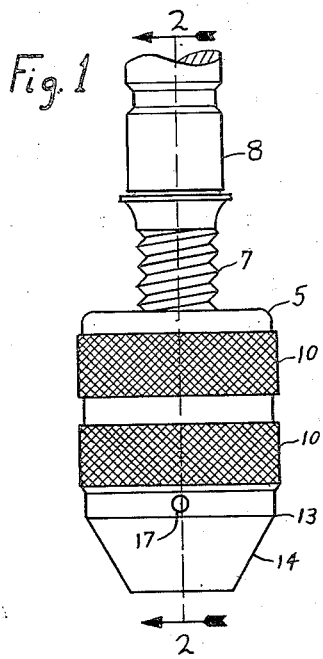
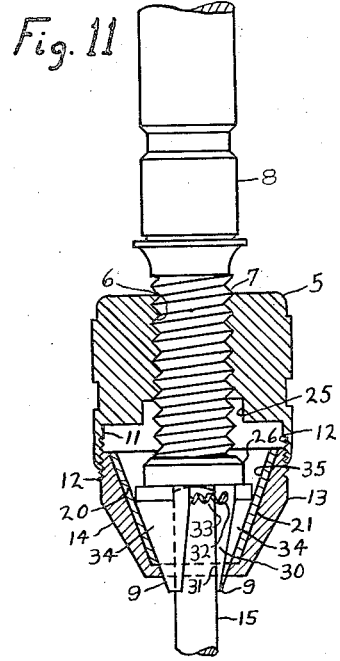
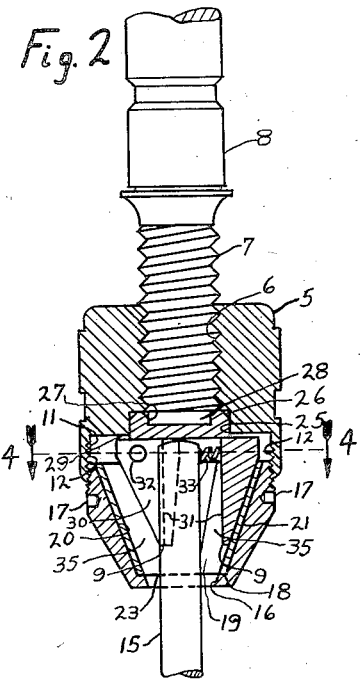
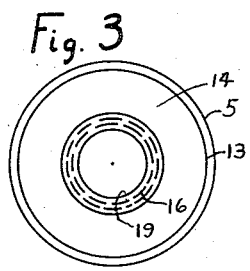
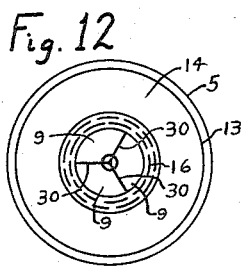
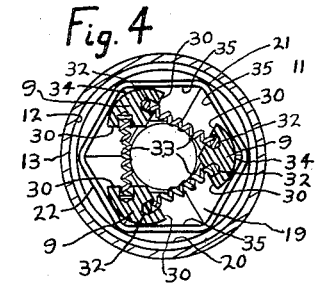
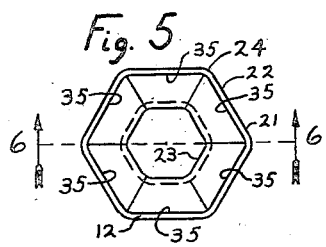
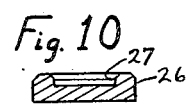
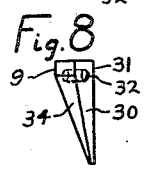
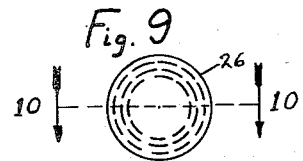
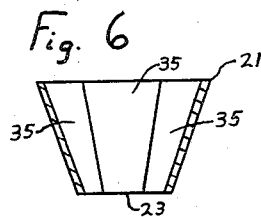
INVENTOR.
Herbert E. Kopsch
BY
George B. Ingersoll.
ATTORNEY.

Patented May 12, 1936

2,040,517

UNITED STATES PATENT OFFICE 2,040,517

CHUCK MECHANISM

Herbert E. Kopsch, Detroit, Mich., assignor to Brown-McLaren Manufacturing Company, Detroit, Mich., a corporation Application October 22, 1934, Serial No. 749,332

13 Claims. (Cl. 279—58)

My invention relates to improvements in a chuck mechanism in which jaw members are actuated to grip tools or similar members therein to accomplish machining and similar operations; and the objects of my invention are, first, to provide a chuck mechanism in which gripping members are retained in alignment with one another and with the axis of the chuck mechanism by means of a liner or guide member inserted in a retainer member; second, to provide a chuck mechanism provided with a guide member made of relatively thin stock mounted in a revolvable retainer member for positioning jaw members for gripping a tool; third, to provide a chuck mechanism having a guide or liner member formed with a polygonal cross section having flat tapered sides adapted to be contacted by a conical surface of jaw members on oppositely disposed sides of the intersection of the tapered flat sides of the guide member; fifth, to provide a chuck mechanism provided with jaw members with a guide or liner member adapted to engage and position jaw members in alignment with each other and for absorbing torsional reactions imposed on the tool in its machining or cutting operation, without the necessity of forming irregular surfaces in a housing member for holding the guide or liner member; and sixth, to provide a chuck mechanism with liner or guide means having flat tapered surfaces to eliminate the necessity of forming similar flat tapered surfaces on the outside of the jaw or gripping members engaging the guide or liner member.

Figure 1 is an outside view of the chuck mechanism mounted on a spindle or similar supporting member; Fig. 2, a vertical section of the chuck mechanism disclosed in Fig. 1, said vertical section being taken on the line 2—2, Fig. 1; Fig. 3, an end view of the chuck mechanism disclosed in Fig. 1; Fig. 4, a sectional view of the chuck mechanism, said sectional view being taken on the line 4—4, Fig. 2; Fig. 5, an end view of the jaw retainer; Fig. 6, a sectional view of the jaw retainer, said sectional view being taken in the line 6—6, Fig. 5; Fig. 7, an end view of one of the jaws of the chuck mechanism; Fig. 8, a side view of the jaw disclosed in Fig. 7; Fig. 9, an end view of the cap or plunger of the chuck mechanism; Fig. 10, a sectional view of the cap or plunger disclosed in Fig. 9, said sectional view being taken on the line 10—10, Fig. 9; Fig. 11, a partial sectional view of the chuck mechanism disclosing the jaws 9 in a position to grip the drill or similar tool 15, the jaws 9 having been actuated slidably downward in the chuck mechanism to grip the sides of the shank of the drill member or similar tool; and Fig. 12, an end view of the chuck mechanism without the drill or similar tool held therein and with the jaws thereof operated to their innermost positions.

Similar numerals refer to similar parts throughout the several views.

The chuck mechanism incorporates the body member 5 which is provided with an axial hole having the threads 6 for engaging the threaded end 7 of the spindle or similar supporting member 8, the body member 5 thus being adapted to be rotated on the spindle 8 and thus to be moved longitudinally fore and aft on the spindle 8 to operate the jaws as more fully disclosed hereinafter.

The body member or housing 5 may be provided with the lands or surfaces 10 to facilitate the gripping of and the rotation of said body member 5 on the threaded portion 7 of the spindle 8 and to render the adjustment movement of the chuck mechanism to be very easily accomplished. The body or housing member 5 is provided with the recess 11 which in turn is provided with the threads 12 which are engaged by similar threads on the outside of the nose, nut, or end retainer member 13 which is thus adjustable and threadably secured in the recess 11 and is adapted to be revolvably operated to its proper assembled position relative to the body member or housing 5, to retain the operative parts of the chuck mechanism as hereinafter disclosed.

The retainer or nut member 13 may be provided with the angular or conically shaped surfaces 14 to improve the symmetry of appearance of the chuck mechanism when the drill 15 or similar tool is held and retained in the chuck mechanism. The retainer or nut member 13 is provided with the hole or opening 16 in its end to permit the drill 15 or similar tool to be inserted therethrough into the jaw mechanism of the chuck unit, the sides of the opening 16 being inclined to form an extension and continuation of the inclined surfaces 35 of the retainer member 21, to facilitate the movement of the jaws 9 through and beyond the lowermost end of the retainer member 13.

Also the retainer member 13 may be provided with a plurality of holes or openings 17 to permit a spanner wrench or similar member to be inserted therein to facilitate the tightening or loosening of the retainer member 13 to facilitate the securement or removal of the drill 15 or similar tool therein. The retainer member 13 will be provided with the shoulder 18 adjacent the opening 16, together with the recess 19 having inwardly and downwardly inclined sides 20, the recess 19 thus being conically shaped to receive the retainer or guide member 21 in which are slidably mounted the jaws 9.

It is to be noted that the retainer member or guide member 21 is provided with a plurality of flat wall portions or sides 22 which are also inclined inwardly and downwardly to the opening 23 at its lower end through which extends the drill or similar tool 15.

It is to be noted that the guide member 21 will have a bearing at its points or corners 24 only on the inclined surfaces 20 of the retainer member 13, the guide member 21 being fixedly supported, as by a press fit in the retainer member 13 so that the guide member 21 will always positively rotate with said retainer member 13.

It is also to be noted that whereas I have disclosed the guide member 21 as being constructed with six sides to form a hexagonally shaped member, I do not restrict my invention to any particular shape or plurality of sides as the guide member 21 may be constructed with different numbers of sides in accordance with the desire to utilize different numbers of jaws 9.

It is further to be noted that the corners 24 of the guide member 21 will thus form a plurality of contacts with the tapered or inclined surface 20 of the retainer or nut member 13 and will thus practically provide a balanced and complete bearing for the guide member 21 in the retainer or nut member 13, the guide member 21 being held with its corner surfaces 24 in close contact with the surface 20 by means of the jaws 9 as hereinafter disclosed, the location of said guide member 21, by its corner surfaces 24, further permitting the economical construction of said guide member 21 to form the thrust absorbing surfaces 35 for restraining the jaws 9 from radial movement about the axis of the chuck mechanism when the jaws 9 are actuated to their positions of engagement with the drill or similar tool 15.

It is to be noted that Fig. 2 discloses the tool or similar member 15 merely in its position for receiving the drill or similar tool 15 when it is inserted in the chuck mechanism and Fig. 11 discloses the tool or similar member 15 as having been securely gripped by the jaws 9 ready for operation, the plunger 26 having been actuated to a position where it extends out of the bore 25.

It is also to be noted that the plunger 26 will always be maintained in a position of alignment with the bore 25 even though the plunger 26 is moved entirely clear of engagement with the bore 25, this being due to the recess 27 of the plunger 26 always being held in concentric alignment with the shoulder portion 28 of the spindle member 8 and the plunger 26 being suitably chamfered to facilitate its entrance into the bore 25 of the body 5.

The body member 5 is provided with the bore or recess 25 in which is slidably mounted the plunger 26 which is provided with the recess 27 for receiving the end 28 of the spindle 8, the end 28 of the spindle 8 being preferably formed as a shouldered portion and free of threads, the plunger 26 thus being rotatably mounted in the recess 25 and on the end 28 of the spindle 8, the thickness of the plunger 26 being preferably slightly greater than the depth of the recess 25 to insure that the jaws 9 are always maintained in such position that when, at their extreme upper or open positions, there exists a slight clearance 29 between the upper ends of the jaws 9 and the bottom or inner end surface of the recess 11 of the body member 5. The plunger 26 is preferably constructed with hardened surfaces to provide increased length of life in its movable engagement with the jaws 9, the end 28, and the body 5.

It is to be noted that the jaws 9 are provided with the flat surfaces 30 which are adapted to always remain located in vertical planes, the relatively sharp surface or edge 31 formed by the intersection or approximate intersection of the surfaces 30 of each jaw thus being adapted to be moved inwardly and outwardly to adjustably fit different sizes of drill or tool members 19 and to grip and hold them securely in the chuck mechanism, it being understood that the surface 31 may be formed by a flat annular, or land surface of relatively narrow width. Also the jaws 9 will be suitably hardened to provide long life and wear qualities to its gripping surfaces 31 and to its thrust and sliding surfaces 34.

It is to be noted that the surfaces 30 will be positioned angularly so that when the jaws, which in this case are three in number, are moved to their innermost position as disclosed in Fig. 12, the three jaws 9 will form three equal parts of a group. Also each of the jaws 9 are provided with the holes or recesses 32 which extend substantially at right angles to the surfaces 30 and are adapted to receive the ends of the spring or resilient members 33 therein, the springs 33 tending to always force the jaws 9 outwardly so that the conical or circumferential surfaces 34 of the jaws 9 will be maintained in engagement with the inner surfaces 35 of the retainer member 21, the jaw 9 being substantially located at the inside surface of the corners 24 in such a manner that the cylindrical surfaces 34 will clear the extreme inside surface of the corners 24 and the cylindrical surfaces 34 will contact the surfaces 35 of the retainer member 21 at points oppositely disposed about the extreme inner surface of the corners 34 to form spaced support or contacting surfaces for each of the jaws 9, thus insuring that the jaws will always be initially aligned and held in a state of alignment relative to the inside surface of the corners 24 and due to the contactual engagement of the conical or circumferential surfaces 34 with the inside surfaces 35, at opposite sides of the inside surface of the corners 34, will prevent the jaws 9 from being displaced circumferentially around the axis of the chuck mechanism, because the circumferential path of the outermost portions of the jaws 9, namely the conical or circumferential surfaces 34, about the axis of the chuck mechanism, intersects the flat wall portions 22 of the guide member 21.

It is to be noted that the conical or cylindrical surface 34 will be inclined inwardly and downwardly to slidably engage the surfaces 35 which are also inclined inwardly and downwardly in the guide member 21 thus insuring that when the body 10 is revolved in one direction on the threads 7 to provide an upward movement of the head 10, longitudinally of the spindle 8, the portion 28 of the spindle 8 will exert a thrust upon the plunger 26 which will in turn exert a thrust upon the upper end surfaces of the jaws 9 and force them downwardly and inwardly along the surfaces 35 to bring the edge surfaces 31 into contact with the peripheral surface of the drill or similar tool 15 to securely grip it and hold it in the chuck mechanism, the jaws 9 being positively revolved by the guide member 21, the plunger 26 being adapted to either revolve with said jaws 9 and relative to the end 29 or to remain fixed relative to the end 28 and to slidably engage the ends of the jaws 9.

It is to be understood that the springs 33 will exert a thrust outwardly against the jaws 9 tending to always force them against the surfaces 35, and due to their inclination, the jaws 9 will always be forced upwardly as well as outwardly so that the upper ends of the jaws will always remain in contact with the lower surface of the plunger 26.

It is to be noted that in the ordinary or conventional type of chuck mechanism that when a tool or similar member 15 is placed therein to be gripped by jaw members, that the operation of machining, cutting, boring, drilling or similar operations by the tool, and also of revolving a head member such as 10 to actuate conventional jaws will tend to exert a thrust circumferentially of and transversely against the jaws 9 in a direction around the axis of the chuck mechanism and which tends to displace the jaws transversely relative to one another, to the axis of the chuck mechanism and to the drill or tool 9 which is to be gripped, with the result that the tool or similar member 15 or any similar object which it is desired to grip securely and hold in alignment for machining purposes, will be thereby displaced out of alignment with the longitudinal axis of the chuck mechanism and the spindle 8. However, in my invention, the positioning of the jaws 9 by the conical or circumferential surfaces 34 adjacent the inside surface of the corners 24 of the guide member 21 will resist and absorb any such circumferential or transverse thrust or resultant force due to the machining operation or the operation of tightening the jaws so that the jaw members will always be held in alignment in positions parallel with each other and with the axis of the chuck mechanism and the spindle 8 with the result that greater accuracy in machining or similar operations can be obtained with my chuck mechanism due to the resultant holding of the tool in proper alignment and concentricity with the axis of the chuck mechanism.

It is to be noted that the spindle 8 may be formed as an integral portion with the conventional spindle of a drill press, lathe, breast drill or similar unit, and in which it is desired to use a chuck mechanism or the spindle 8 may be secured in the spindle members of such mechanism in a conventional or suitable manner for supporting the spindle member 8 for the machining operations so that the spindle 8 in turn supports the chuck mechanism in an adjustable manner thereon.

It is thus to be noted that I have provided a chuck mechanism that not only insures the jaw members thereof to be actuated and held in alignment during the operation of adjustably engaging and securing a tool for machining operations but also provides simple and efficient means whereby the terrific thrust reactions due to the torsional and similar loads imposed upon a cutting tool are completely absorbed without misalignment of the cutting tool, the jaw members, or their supporting mechanisms. In operation the shank of the drill or similar tool 15 is inserted between the edges 31 of the jaw 9 when the jaws 9 are in an open position as disclosed in Fig. 2 and then the head 10 is rotated upon the threads 7 of the spindle 8 which will move the head and its jaw mechanism upwardly on the threads 7 of the spindle 8 and will cause the plunger 26 to be forced against the upper surfaces of the jaw member which will in turn slidably actuate the jaws 9 downwardly and inwardly along the surfaces 35 and in their positively located positions adjacent the corners 24, thus bringing the edges 31 of the jaws 9 downwardly and inwardly until the jaws 31 contact and grip the shank of the drill or tool 15, or similar tool, in position for a drilling or machining operation.

I claim:

1. In a chuck mechanism for gripping a tool, the combination of a spindle member having a threaded portion, a body provided with a threaded hole for engaging the threaded portion of said spindle, said body being provided with a second threaded portion at its end opposite from said threaded hole, said body being further provided with a retainer member threadably engaging said second threaded portion of said body and provided with a chamber having inclined wall surfaces together with a shouldered portion having an opening therethrough, a guide member provided with a plurality of inclined flat walls having intersecting wall portions for engaging the inclined wall surfaces of said chamber of said retainer member, a plurality of jaws each having inclined surfaces engaging the inclined flat walls of said guide member at opposite sides of its intersecting wall portions, said jaws each being further provided with gripping surfaces extending longitudinally between a pair of angular surfaces, said jaws each being provided with openings in each of its pair of angular surfaces, resilient members supported in and extending between the openings in the angular surfaces of said jaws, said resilient members exerting forces tending to move said jaws upwardly adjacent the inclined flat walls of said guide member, and a plunger rotatably mounted on said spindle member, said plunger being adapted to slidably engage said bore of said body, said plunger engaging the ends of said jaws to force said jaws longitudinally of the axis of the chuck mechanism and to and from each other.

2. In a chuck mechanism for holding a tool, the combination of a spindle member, a housing mechanism revolvably mounted on said spindle member, jaws adapted to be moved to and from one another when said housing mechanism is revolvably mounted on said spindle member, and means for retaining said jaws in alignment with each other and with said housing mechanism, said means absorbing torsional thrust loads resulting from the operation of said tool, said means comprising a liner member having a plurality of sides contacting said jaws only at points located between the intersection of said sides.

3. In a chuck mechanism for gripping a tool, the combination of a guide member provided with a plurality of inclined wall portions connected together to form corners, means for supporting said guide member on the outside surfaces of said corner portions, jaw members slidably mounted adjacent the inside surfaces of the corner portions of said guide member, and means for actuating said jaw members.

4. In a chuck mechanism for gripping a tool, the combination of a guide member provided with a plurality of wall portions inwardly inclined toward one another, a plurality of jaw members slidably supported in said guide member, each of said jaw members slidably contacting two of said wall portions solely at points located between the intersection of said wall portions, and means for actuating said jaw members longitudinally of said guide member.

5. In a chuck mechanism for holding a tool, the combination of a guide member provided with a plurality of wall portions inwardly inclined toward one another, a plurality of jaw members each provided with a circumferential surface inwardly inclined, said circumferential surface engaging two of said wall portions of said guide member solely at points between the intersections of said wall portions, and means for actuating said jaw members longitudinally of said guide member.

6. In a chuck mechanism for gripping a tool, the combination of a guide member suitably mounted and having a plurality of walls forming corner portions, said walls being inclined to one another, a plurality of jaw members each movably supported adjacent a corner portion of said guide member, said jaw members having conical surfaces engaging said walls and clearing the corner portions thereof, a plunger slidably mounted and engaging ends of said jaw members, and means for actuating said plunger to move said jaw members in said guide member.

7. In a chuck mechanism for gripping a tool, the combination of a guide member suitably mounted and having a plurality of wall portions connected together to form corner portions, said wall portions being inclined inwardly toward the axis of the chuck mechanism, a plurality of jaw members movably engaging said wall portions adjacent said corner portions, said jaw members each having conical surfaces for engaging said wall portions, said conical surfaces being positioned out of engagement with said corner portions, a plunger, means for actuating said plunger to move said jaw members longitudinally in said guide member, and resilient means suitably mounted between said jaw members to force said jaw members toward said wall portions of said guide member.

8. In a chuck mechanism, the combination of a guide member having a plurality of side wall portions inclined toward one another, said side wall portions connecting to form inside corner portions, a housing enclosing said guide member, a plurality of jaw members each movably supported adjacent one of said inside corner portions of said guide member, said jaw members being provided with conical surfaces located out of engagement with said corner portions, said jaw members being lesser in number than said inside corner portions of said guide member, and means for actuating said jaw members.

9. In a chuck mechanism, the combination of a guide member having a plurality of flat side wall portions inclined toward one another, said flat side wall portions being connected to form inside and outside corner portions, a housing provided with a tapered hole engaged by the outside corner portions only of said guide member, a plurality of jaw members each located adjacent one of said inside corner portions of said guide member, said jaw members each having a conical surface solely engaging said flat side wall portions only of said guide member, said jaw members being lesser in number than said inside corner portions of said guide member, means for actuating said jaw members, and resilient means connecting said jaw members to force said jaw members toward said guide member.

10. In a chuck mechanism for gripping a tool, the combination of a housing, a retainer member rotatably mounted in said housing and having a conical shaped recess together with a second recess connecting therewith, said retainer member being provided with a shoulder between said recesses, a guide member having a polygonal shaped cross section and having an end engaging the shoulder of said retainer member, jaws slidably mounted in said guide member and adapted to extend through said second recess of said retainer member, said jaws being adapted to grip the tool, said jaws being positively driven by contact with the polygonal shaped cross section of said guide member solely at points between the intersection of the sides thereof, and means for actuating said jaws.

11. In a chuck mechanism for gripping a tool, the combination of a spindle member, jaw members for gripping said tool and provided with a circumferential conical surface, a housing structure rotatably mounted on said spindle member and supporting said jaw members in a manner to guide said jaw members to and from each other, said housing structure being provided with inclined flat surfaces for engaging the circumferential conical surfaces of said jaw members, means connecting said spindle member and said jaw members to move said jaw members together to grip the tool when said housing structure is rotated in one direction, and resilient means for moving said jaw members from one another when said housing structure is rotated in an opposite direction.

12. In a chuck mechanism, the combination of a guide member formed of relatively thin material having substantially equal wall thickness throughout, said guide member having its inner and outer side surfaces formed to extend in intersecting planes inclined to one another longitudinally and in transverse directions relative to the axis of said side member, a retainer member provided with a tapered hole surrounding and engaging said guide member intermittently therearound, said surfaces of said tapered hole of said retainer member engaging said guide member along the outer edge surfaces only of the intersection portion of said guide member, jaw members each engaging a pair of inside surfaces of said guide member, and means for actuating said jaw members longitudinally in said guide member.

13. In a chuck mechanism, the combination of a spindle member adapted to be rotated, a housing rotatably mounted on said spindle member and adapted to travel longitudinally on said spindle member when said housing is rotated relative to said spindle member, said housing being driven by said spindle, a retainer member rotatably mounted in and driven by said housing, said retainer member being adapted to move longitudinally relative to said housing when said retainer member is rotated relative to said housing, said retainer member being provided with an opening extending therethrough together with a shoulder at the outer end of said opening, a guide member fixedly mounted in said retainer member, said guide member being driven by said retainer member to rotate therewith, said guide member being located longitudinally in one direction by engagement with said shoulder of said retainer member, jaw members slidably mounted in said guide member and positively driven by said guide member to rotate therewith, a plunger interposed between said jaw members and said spindle to move said jaw members longitudinally when said housing is rotated relative to said spindle member, and resilient means opposing the movement of said jaw members by said means connecting said jaw members and said spindle member.

HERBERT E. KOPSCH.